July 5, 1927.
S. J. NORDSTROM
1,634,722
VALVE
Filed June 12, 1926
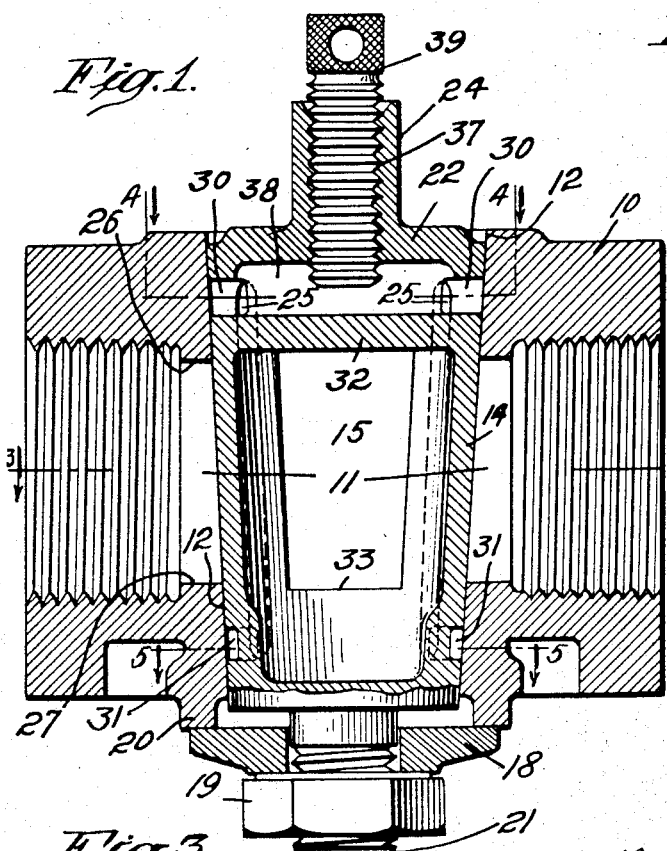
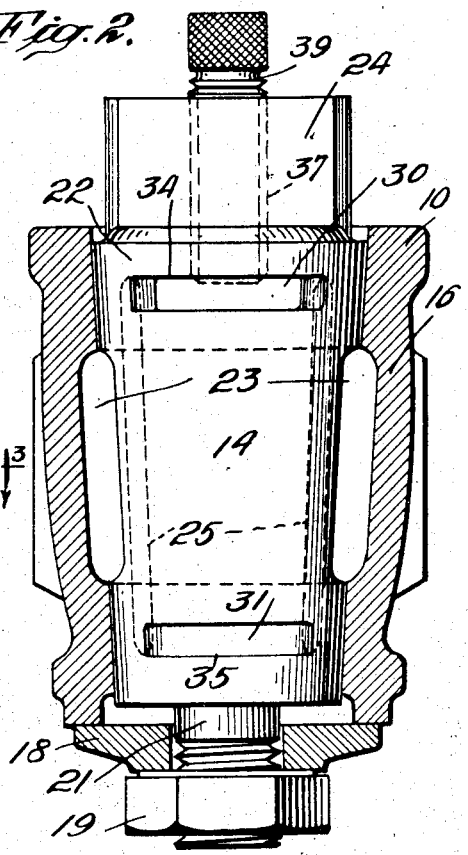
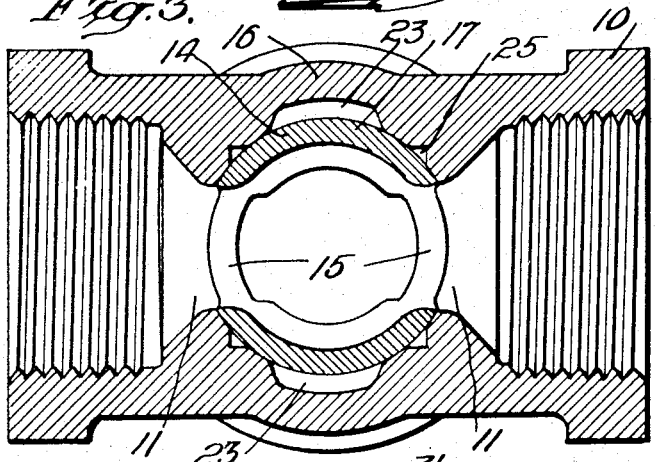
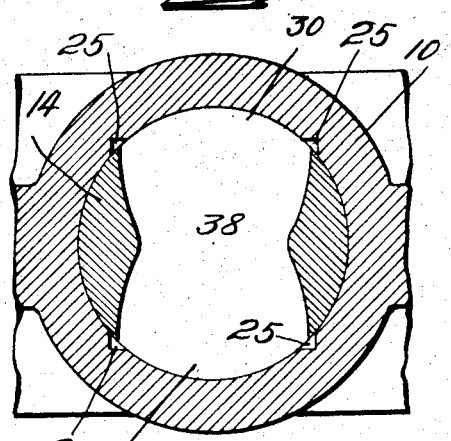
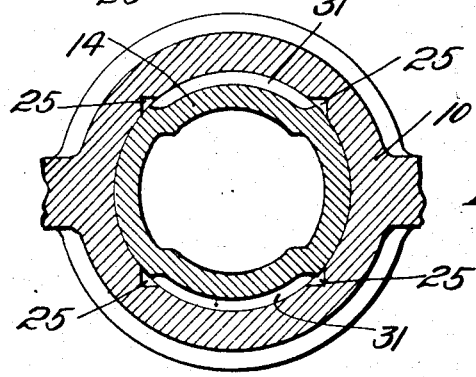
INVENTOR
Sven Johan Nordstrom
BY Archibald Cox
ATTORNEY Patented July 5, 1927.

1,634,722

UNITED STATES PATENT OFFICE.

SVEN JOHAN NORDSTROM, OF SAN FRANCISCO, CALIFORNIA, ASSIGNOR TO MERCO NORDSTROM VALVE COMPANY, OF SAN FRANCISCO, CALIFORNIA, A CORPORATION OF DELAWARE.

VALVE.

Application filed June 12, 1926. Serial No. 115,413. REISSUED

The invention relates to an improvement in valves, and more particularly to an improvement in plug valves of the type in which lubrication of the bearing or seating surfaces of the valve is effected by forcing lubricant under pressure into the contact joint between the plug and the valve seat in the casing.

The pressure lubrication principle as applied to plug valves has heretofore been largely restricted to the heavier and more expensively constructed plug valves, but since pressure lubrication assures a properly lubricated and positively sealed or non-leakable valve, it has been proposed that this principle be applied to plug valves of the cheapest and lightest construction, such as are used for gas and similar service. One of the requirements of this kind of service is that the valve be sealed so as to be non-leakable. To prevent the valve from leaking it has been necessary to lap or grind carefully the bearing or seating surfaces between the plug and its seat. This, of course, adds to the cost of the valve.

One object of the present invention is to incorporate the pressure lubrication principle in plug valves of the very cheapest and lightest construction so that these valves may be manufactured even more cheaply than heretofore and yet be properly lubricated and sealed. Another object of the invention is to arrange the lubrication system of the valve in such manner that the plug may be turned completely round in its seat, that is, through an angle of 360°, without exposing the lubricant under pressure to the fluid passing through the valve. A more specific object of the invention is to provide a plug valve of this type with a system of lubricating grooves of such arrangement that when the plug is in closed position the grooves on each side of the passageway through the valve seat cooperate to constitute a continuous groove completely surrounding the passageway which may be filled with lubricant under pressure to prevent leakage past the plug. To the accomplishment of these objects the invention consists in the improved plug valve more fully described hereinafter and particularly pointed out in the appended claims.

In the accompanying drawings illustrating the preferred form of the invention, Fig. 1 is a longitudinal section through the improved valve, with the plug in closed position; Fig. 2 is a transverse section taken across the valve shown in Fig. 1; Fig. 3 is a section taken along the line 3—3 of Fig. 1, but with the plug shown in open position; and Figs. 4 and 5 are sections taken along the lines 4—4 and 5—5, respectively, of Fig. 1.

The improved valve as illustrated in the drawings comprises a body part or casing 10 having a longitudinal passageway 11 therethrough and a tapered valve seat 12 formed transversely of the passageway 11. Seated in the tapered valve seat 12 is a tapered plug 14 having a hole 15 adapted to register with the passageway 11 when the valve is open, as shown in Fig. 3. These parts are formed as usual, but it will be observed from a consideration of the figures that the plug and the casing are of the lightest and cheapest construction. The side walls 16 of the casing are made as thin as practicable, and the plug 14 is hollowed out leaving only the relatively thin concentric walls 17 in its middle part. The longitudinal recesses 23 in the valve seat 12 facilitate reaming the valve seat and so reduce the cost of manufacture. The parts are formed in this manner by casting.

The tapered valve seat 12 extends entirely through the casing 10. The plug 14 is held in the valve seat by means of a collar 18 and a nut 19. The collar 18 bears against a circumferential flange 20 formed on one side of the casing and the nut 19 is threaded onto a stem 21 projecting from the smaller end of the plug. The larger end 22 of the plug closes the larger end of the tapered opening through the casing. Projecting outwardly from the larger end of the plug is a valve stem 24 flattened to accommodate a wrench by which the plug may be manipulated to open and close the valve. It will be observed that this arrangement of parts and the means for holding the plug against its seat is of the simplest, and is correspondingly cheap to produce. Usually the plug 14 is lapped or ground into its seat in order to make a tight joint between them. According to the present invention the necessity for making a tight joint by protracted lapping or grinding is eliminated, since by means of the present invention the joint between the plug 14 and the valve seat 12 is lubricated under pressure and any irregularities in the seating or bearing surfaces of these parts are filled with lubricant and a tight joint thereby established. Moreover, according to one of the features of the invention, when the plug is in closed position a seal of lubricant is established completely surrounding the passageway through the casing, thereby positively preventing any leakage from one side of the line into the other.

The means provided by the present invention for lubricating the contact joint between the plug and the valve seat and for sealing this joint and the passageway through the casing, when the plug is turned to closed position, as shown in Fig. 1, comprises a plurality of longitudinally arranged lubricating grooves 25 formed longitudinally in the bearing surface of the valve seat 12. These grooves are V-shaped in cross section and are preferably cast in the casing to save the cost of machining. In the illustrated embodiment of the improved valve there are four longitudinal grooves 25 spaced substantially 90° apart. Each groove is located adjacent to one of the lateral sides of the passageway 11 through the valve seat. The two longitudinal grooves at either the inlet or outlet side of the passageway constitute what is hereinafter termed "a pair of longitudinal grooves." The upper and lower ends of the grooves 25 extend above and below the upper side 26 and the lower side 27, respectively, of the passageway 11. (The use of the terms "upper" and "lower" with respect to various parts of the valve is understood to be relative only and refers to the position of the valve as shown in the drawings.) Formed in the bearing surface of the upper or larger end of the plug and on opposite sides thereof are two transverse lubricating grooves 30, each groove being substantially 90° in length. And in the bearing surface of the lower or smaller end of the plug and on opposite sides thereof are two transverse lubricating grooves 31, each groove being substantially 90° in length. These two pairs of transverse grooves 30 and 31, although arcuate in longitudinal section, as shown in Fig. 5, are regarded as parallel with the hole 15 through the plug.

It will be observed by reference to Figs. 1 and 2 that the grooves 30 are located above the plane passing through the upper edge 32 of the hole 15 and that the lower grooves 31 are located below the plane passing through the lower edge 33 of the hole 15. The upper edges 34 of the grooves 30 are substantially in the same plane as the upper ends of the longitudinal grooves 25, and the lower edges 35 of the grooves 31 are substantially in the same plane as the lower ends of the longitudinal grooves 25, as clearly shown in Figs. 1 and 2. The two sets of grooves 30 and 31 are cast in the plug 14 to save the cost of machining.

By means of this arrangement of lubricating grooves the novel mode of operation and the advantages of the improved valve are attained. It is possible to turn the plug through an angle of 360° without exposing a groove or grooves in which there is lubricant under pressure to the fluid passing through the line. It is possible to seal the passageway through the casing by surrounding the passageway with continuous or closed circuit grooves filled with lubricant under pressure when the plug is in closed position. And it is not necessary to accurately lap or grind in the contact joint between the plug and the valve seat because the travel of the plug past the longitudinal grooves 25 causes the plug to take up lubricant and smear it over the valve seat 12, thereby filling the irregularities of the incompletely machined surfaces, with the result that the bearing surfaces are effectively lubricated.

When the valve is close with the plug turned so that the hole 15 is arranged transversely of the passageway 11 and the side 17 of the plug closes the opening through the valve seat, the two upper transverse grooves 30 span the upper ends of the two pairs of longitudinal grooves 25 and the lower grooves 31 span the lower ends of the longitudinal grooves 25, thus establishing around each end of the opening through the valve seat a continuous groove adapted to be filled with lubricant under pressure. And on the other hand, when the valve is open with the plug turned so that the hole 15 is in alinement with the passageway 11, the upper transverse grooves 30 span and bring into communication the upper ends of the two grooves 25 on each side of the casing, as shown in Fig. 4, and the lower transverse grooves 31 span and bring into communication the lower ends of the two grooves 25 on each side of the casing, as clearly indicated in Fig. 5. But in any intermediate position of the plug, the grooves 30 and 31 can be in effective communication with only two diametrically disposed longitudinal grooves 25. The diametrically disposed longitudinal grooves 25 with which the transverse grooves 30 and 31 are in communication while the plug is in its intermediate positions are never exposed to the fluid passing through the line, because the grooves 30 and 31 are arranged parallelly with the hole 15. The other diametrically disposed grooves 25, the two with which the grooves 30 and 31 are not in communication, are exposed to the fluid passing through the line. But since these longitudinal grooves are cut off from the transverse grooves at this time, only the small amount of lubricant that is in the exposed grooves can pass into the line or be attacked by the fluid passing through the valve. Thus by the present construction it is possible to stop the plug at any point in its 360° of rotation and put the lubricant in the grooves under pressure without forcing any of the lubricant into the line. And there is no waste of lubricant, except the relatively small amount which may be dissolved or washed out of the exposed grooves.

The means for introducing the lubricant under pressure into the grooves comprises a reservoir consisting of a hole 37 formed axially in the valve stem 24 and a cored hole 38 formed transversely in the upper or larger end of the plug 14 and connecting at its outer ends the two opposite transverse grooves 30, as shown in Fig. 4. The hole 37 in the valve stem 24 is threaded to receive a pressure screw 39 by which the lubricant in the various connected passageways and grooves is put under pressure.

Having thus described the invention what I claim as new is:—

1. A valve comprising, a casing having a longitudinal passageway therethrough and a tapered valve seat formed transversely of the passageway, a tapered plug seated in the valve seat and having a hole adapted to register with the passageway, means for holding the plug against its seat, the valve seat being provided with four longitudinal grooves spaced substantially 90° apart extending above and below, respectively, the planes passing through the upper and lower sides of the passageway through the valve seat, the bearing surface of the plug being provided at the larger end of the plug with two transverse grooves lying in the plane passing through the upper ends of the longitudinal grooves and at the smaller end of the plug with two transverse grooves lying in the plane passing through the lower ends of the longitudinal grooves, each pair of transverse grooves being substantially 90° in length and arranged parallel with the hole through the plug, the ends of each pair of transverse grooves being spaced substantially 90° apart, a reservoir in the plug for containing lubricant, connections between the reservoir and one pair of transverse grooves, and means for putting the lubricant in the reservoir under pressure to force it into the grooves.

2. A valve comprising, a casing having a passageway therethrough and a tapered valve seat formed transversely of the passageway, a tapered plug seated in the valve seat and having a hole adapted to register with the passageway, means for holding the plug against its seat, the valve seat being provided on each lateral side of the passageway therethrough with a longitudinal groove extending at each end beyond the passageway, the seating surface of the plug being provided with a transverse groove on each side thereof above and below the planes of the upper and lower edges of the hole and parallel with the hole, the upper pair of transverse grooves lying in the plane passing through the upper ends of the longitudinal grooves and the lower pair of transverse grooves lying in the plane passing through the lower ends of the longitudinal grooves, the transverse grooves being long enough to span and no more two adjacent longitudinal grooves when the plug is in closed and in open position, a reservoir in the plug for containing lubricant connected with one pair of transverse grooves, and means for putting the lubricant under pressure to force it into the transverse and longitudinal grooves.

3. A valve comprising, a casing having a passageway therethrough and a tapered valve seat formed transversely of the passageway, a tapered plug seated in the valve seat and having a hole adapted to register with the passageway, longitudinal and transverse grooves in the seating surface of the valve arranged to form when the plug is in its open and closed positions two diametrically opposed closed circuit grooves, a reservoir for containing plastic substance, connections between the reservoir and all the grooves when the plug is in its substantially full open and closed positions only, and means for putting the plastic substance under pressure.

4. A valve comprising, a casing having a passageway therethrough and a tapered valve seat formed transversely of the passageway, a tapered plug seated in the valve seat and having a hole adapted to register with the passageway, longitudinal and transverse grooves in the seating surface of the valve arranged to form when the plug is in either its substantially full closed or open position two diametrically opposed closed circuit grooves, and means for introducing a plastic substance under pressure into the grooves, the longitudinal grooves being so arranged that they are only supplied with lubricant under pressure when they are not exposed to the fluid passing through the valve, but are cut off from the supply of lubricant under pressure when they are exposed to the fluid passing through the valve.

5. A valve comprising, a casing having a passageway therethrough and a tapered valve seat formed transversely of the passageway, a tapered plug seated in the valve seat and having a hole adapted to register with the passageway, longitudinal and transverse grooves in the seating surface of the valve arranged to form a continuous groove surrounding the hole and passageway when the plug is in closed position, and means for introducing a plastic substance under pressure into the grooves, the longitudinal grooves being so arranged that they are only supplied with lubricant under pressure when they are not exposed to the fluid passing through the valve, but are cut off from the supply of lubricant under pressure when they are exposed to the fluid passing through the valve.

SVEN JOHAN NORDSTROM.